United States Patent
Croop et al.

[19]

[11] Patent Number: 6,082,041

[45] Date of Patent: Jul. 4, 2000

[54] LURE TRANSPORTING SYSTEM

[76] Inventors: Leonard A. Croop; Mary Ann Croop, both of 8039 St. Rd. #54, Lot #146, New Port Richey, Fla. 34653

[21] Appl. No.: 09/268,838

[22] Filed: Mar. 16, 1999

[51] Int. Cl.$^7$ .................................................. A01K 87/00
[52] U.S. Cl. ............................................. 43/57.1
[58] Field of Search .................................. 43/25.2, 57.1; 206/315.1

[56] References Cited

U.S. PATENT DOCUMENTS

| | | | |
|---|---|---|---|
| 911,117 | 2/1909 | Crosier | 43/57.1 |
| 2,285,888 | 6/1942 | Benton | 43/57.1 |
| 2,825,992 | 3/1958 | Miller | 43/57.1 |
| 3,484,980 | 12/1969 | Wait | 43/57.1 |
| 5,430,969 | 7/1995 | Taylor | 43/57.1 |
| 5,857,285 | 1/1999 | Little | 43/57.1 |

*Primary Examiner*—Thomas Price

[57] ABSTRACT

A lure transporting system for conveniently and safely storing a fishing lure that remains attached to the fishing line of a fishing rod while maintaining the fishing lure readily accessible to the fisherman. The inventive device includes a container having at least one side wall, a floor and an opening for receiving and storing a conventional fishing lure. A lid is pivotally attached to the container for allowing selective closing of the opening of the container during use. An attachment bracket is secured to the side of the container for allowing selective attachment to a conventional fishing rod. The attachment bracket comprises a base secured to the side wall of the container, a U-member extending from the base, and a first cuff and a second cuff secured to opposing sides of the U-member and connected to one another for engaging the shaft of the fishing rod. The lid is preferably pivotally attached to the container by a support ring and a spring hinge. The lip of the lid fits loose enough upon the opening of the container for allowing a conventional fishing line to pass between during storage of a fishing lure. The container is preferably comprised of a transparent or semi-transparent material for allowing viewing of the fishing lure. In addition, the container is preferably comprised of a lightweight material such as plastic. Various combinations of the present invention may be utilized such as attaching more than one container to the attachment bracket or compartmentalizing the container.

9 Claims, 5 Drawing Sheets

LURE TRANSPORTING SYSTEM

BACKGROUND OF THE INVENTION

1. Field of the Invention

The present invention relates generally to fishing lures and more specifically it relates to a lure transporting system for conveniently and safely storing a fishing lure that remains attached to the fishing line of a fishing rod while maintaining the fishing lure readily accessible to the fisherman.

2. Description of the Prior Art

Fishing lures have been in use for years. Typically, a fisherman will attach a fishing lure to a fishing line of a fishing rod. The fisherman will then repeatedly cast the fishing lure into a lake or river in an attempt to catch a fish. After the fisherman is done fishing, he has two options regarding the attached fishing lure. He can either remove the lure from the fishing line and place it within a conventional tackle box, or he can simply attach the fishing lure to one of the many loops attached to the fishing line.

Conventional tackle boxes are bulky and inconvenient to utilize. For short fishing trips to a nearby river or lake, transporting a large tackle box is generally not required since the fisherman will probably only utilize a few fishing lures. Conventional tackle boxes are also prone to accidentally opening during transportation. Also, conventional tackle boxes usually retain the fishing lures extremely close together thereby inducing entanglement of the fishing lures. In addition, if the user stores the fishing lures within the conventional tackle box, it takes a significant amount of time to open the tackle box, locate the desired fishing lure and then attach the fishing lure to the line of the fishing rod.

Securing the fishing lure to the loops of the fishing rod is undesirable because of the inherent safety risks. The hooks of the fishing lure are exposed thereby potentially penetrating the fisherman or other individual's skin. In addition, the exposed hooks attached to the loop of the fishing rod are susceptible to engaging surrounding fishing rods thereby creating an entangled structure that sometimes requires severing of the fishing lines.

While these devices and methods may be suitable for the particular purpose to which they address, they are not as suitable for conveniently and safely storing a fishing lure that remains attached to the fishing line of a fishing rod while maintaining the fishing lure readily accessible to the fisherman. Conventional methods and devices for storage of fishing lures promote entanglement amongst the fishing lures. In addition, conventional methods of storing fishing lures while retained upon the fishing line are dangerous to individuals in contact with the fishing rods.

In these respects, the lure transporting system according to the present invention substantially departs from the conventional concepts and designs of the prior art, and in so doing provides an apparatus primarily developed for the purpose of conveniently and safely storing a fishing lure that remains attached to the fishing line of a fishing rod while maintaining the fishing lure readily accessible to the fisherman.

SUMMARY OF THE INVENTION

In view of the foregoing disadvantages inherent in the known types of fishing tackle storage devices now present in the prior art, the present invention provides a new lure transporting system construction wherein the same can be utilized for conveniently and safely storing a fishing lure that remains attached to the fishing line of a fishing rod while maintaining the fishing lure readily accessible to the fisherman.

The general purpose of the present invention, which will be described subsequently in greater detail, is to provide a new lure transporting system that has many of the advantages of the fishing tackle storage devices mentioned heretofore and many novel features that result in a new lure transporting system which is not anticipated, rendered obvious, suggested, or even implied by any of the prior art fishing tackle storage devices, either alone or in any combination thereof.

To attain this, the present invention generally comprises a container having at least one side wall, a floor and an opening for receiving and storing a conventional fishing lure. A lid is pivotally attached to the container for allowing selective closing of the opening of the container during use. An attachment bracket is secured to the side of the container for allowing selective attachment to a conventional fishing rod. The attachment bracket comprises a base secured to the side wall of the container, a U-member extending from the base, and a first cuff and a second cuff secured to opposing sides of the U-member and connected to one another for engaging the shaft of the fishing rod. The lid is preferably pivotally attached to the container by a support ring and a spring hinge. The lip of the lid fits loose enough upon the opening of the container for allowing a conventional fishing line to pass between during storage of a fishing lure. The container is preferably comprised of a transparent or semi-transparent material for allowing viewing of the fishing lure. In addition, the container is preferably comprised of a lightweight material such as plastic. Various combinations of the present invention may be utilized such as attaching more than one container to the attachment bracket or compartmentalizing the container.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a lure transporting system that will overcome the shortcomings of the prior art devices.

Another object is to provide a lure transporting system that prevents the hooks of a fishing lure from engaging an individual.

An additional object is to provide a lure transporting system that prevents entanglement of fishing rods.

A further object is to provide a lure transporting system that provides a readily accessible fishing lure while fishing.

Another object is to provide a lure transporting system that eliminates the requirement for a conventional tackle box.

A further object is to provide a lure transporting system that may remain attached to the fishing rod if desired without interfering with the operation of the fishing rod.

Another object is to provide a lure transporting system that may be utilized as a packaging container for a fishing lure for sales of the fishing lure within a store.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
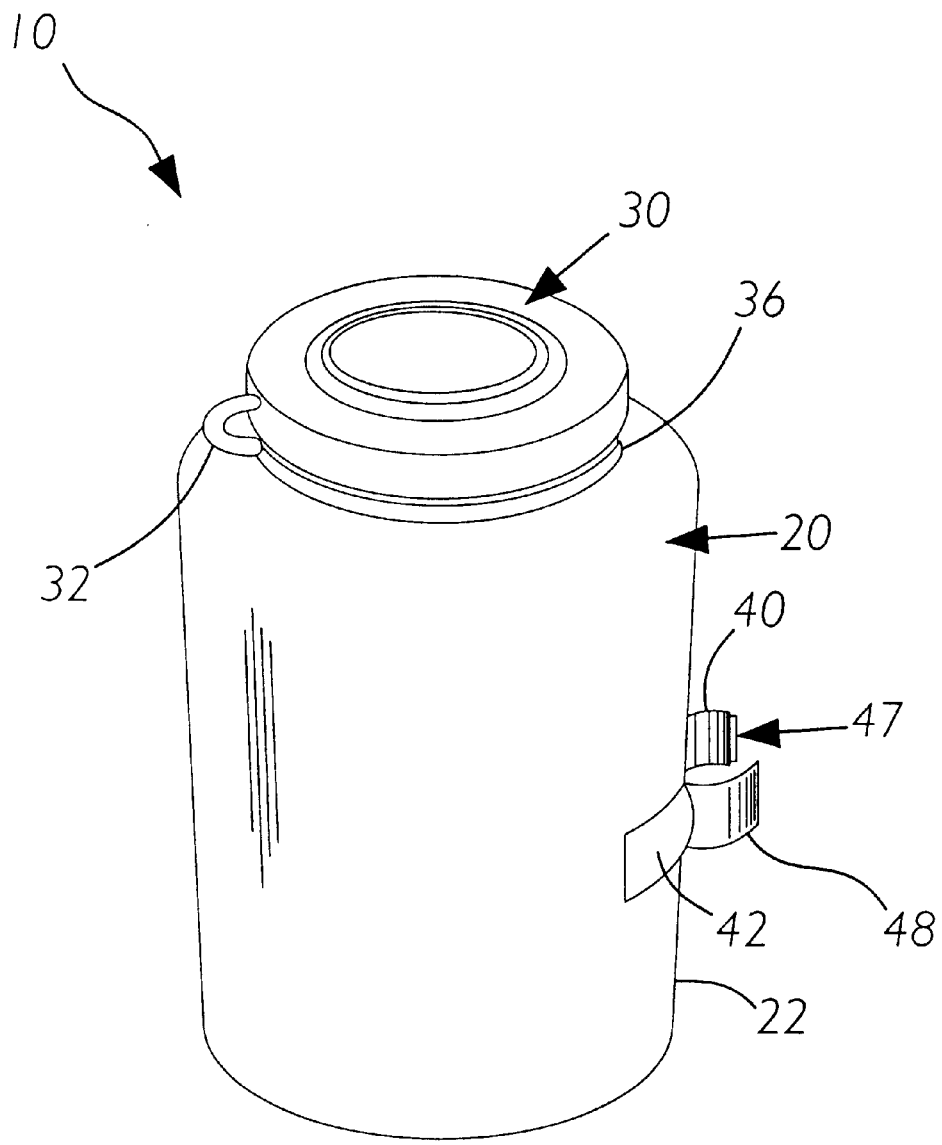
FIG. 1 is an upper perspective view of the present invention with the lid closed.
Figure 2:
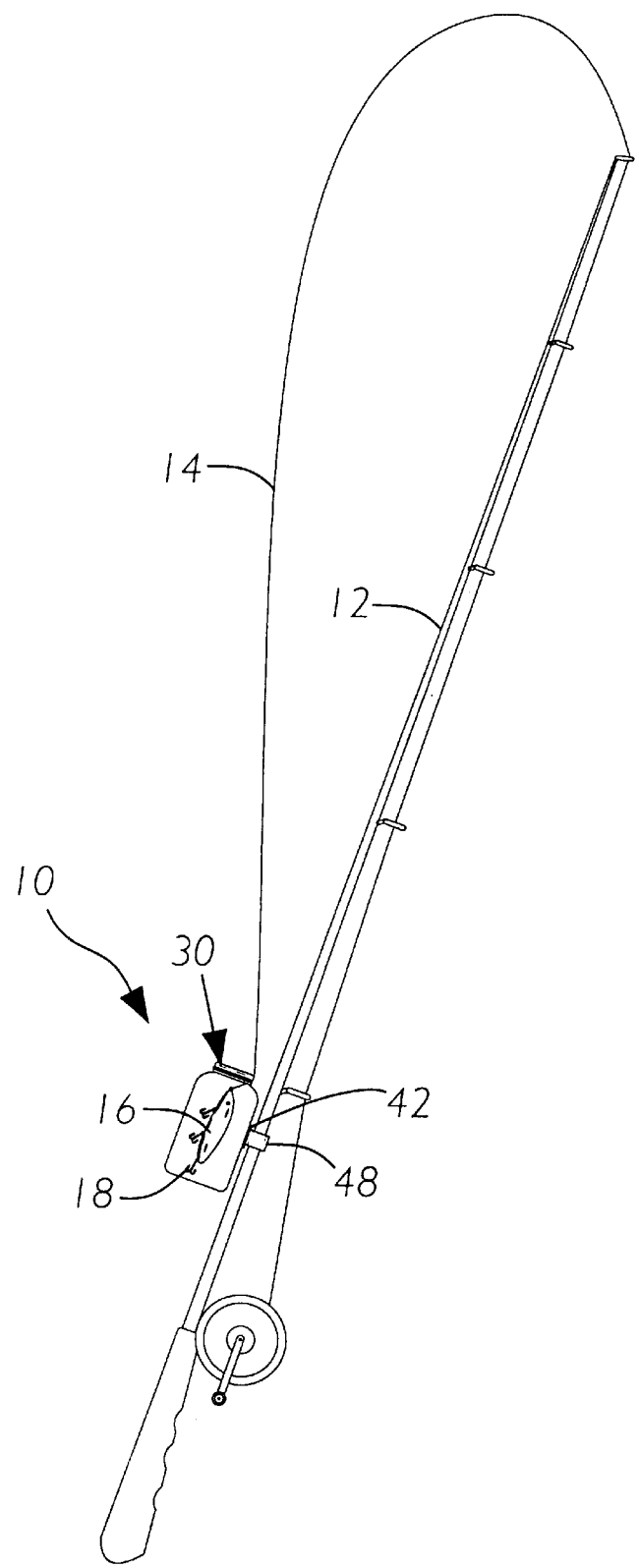
FIG. 2 is a side view of the present invention attached to a fishing rod with a fishing lure safely retained therein.

Turning now descriptively to the drawings, in which similar reference characters denote similar elements throughout the several view, FIGS. 1 through 5 illustrate a lure transporting system 10, which comprises a container 20 having at least one side wall 22, a floor 24 and an opening 26 for receiving and storing a conventional fishing lure 16. A lid 30 is pivotally attached to the container 20 for allowing selective closing of the opening 26 of the container 20 during use. An attachment bracket 40 is secured to the side of the container 20 for allowing selective attachment to a conventional fishing rod 12. The attachment bracket 40 comprises a base 42 secured to the side wall 22 of the container 20, a U-member 44 extending from the base 42, and a first cuff 46 and a second cuff 48 secured to opposing sides of the U-member 44 and connected to one another for engaging the shaft of the fishing rod 12. The lid 30 is preferably pivotally attached to the container 20 by a support ring 36 and a spring hinge 32. The lip 34 of the lid 30 fits loose enough upon the opening 26 of the container 20 for allowing a conventional fishing line 14 to pass between during storage of a fishing lure 16. The container 20 is preferably comprised of a transparent or semitransparent material for allowing viewing of the fishing lure 16. In addition, the container 20 is preferably comprised of a lightweight material such as plastic. Various combinations of the present invention may be utilized such as attaching more than one container 20 to the attachment bracket 40 or compartmentalizing the container 20.

As shown in FIGS. 1 through 5, the container 20 is preferably comprised of a cylindrical shape, however it can be appreciated by one skilled in the art that any other well-known shape may be utilized. The container 20 is preferably constructed of a lightweight, transparent or semi-transparent material such as plastic, however any other well-known material may be utilized.

Figure 3:
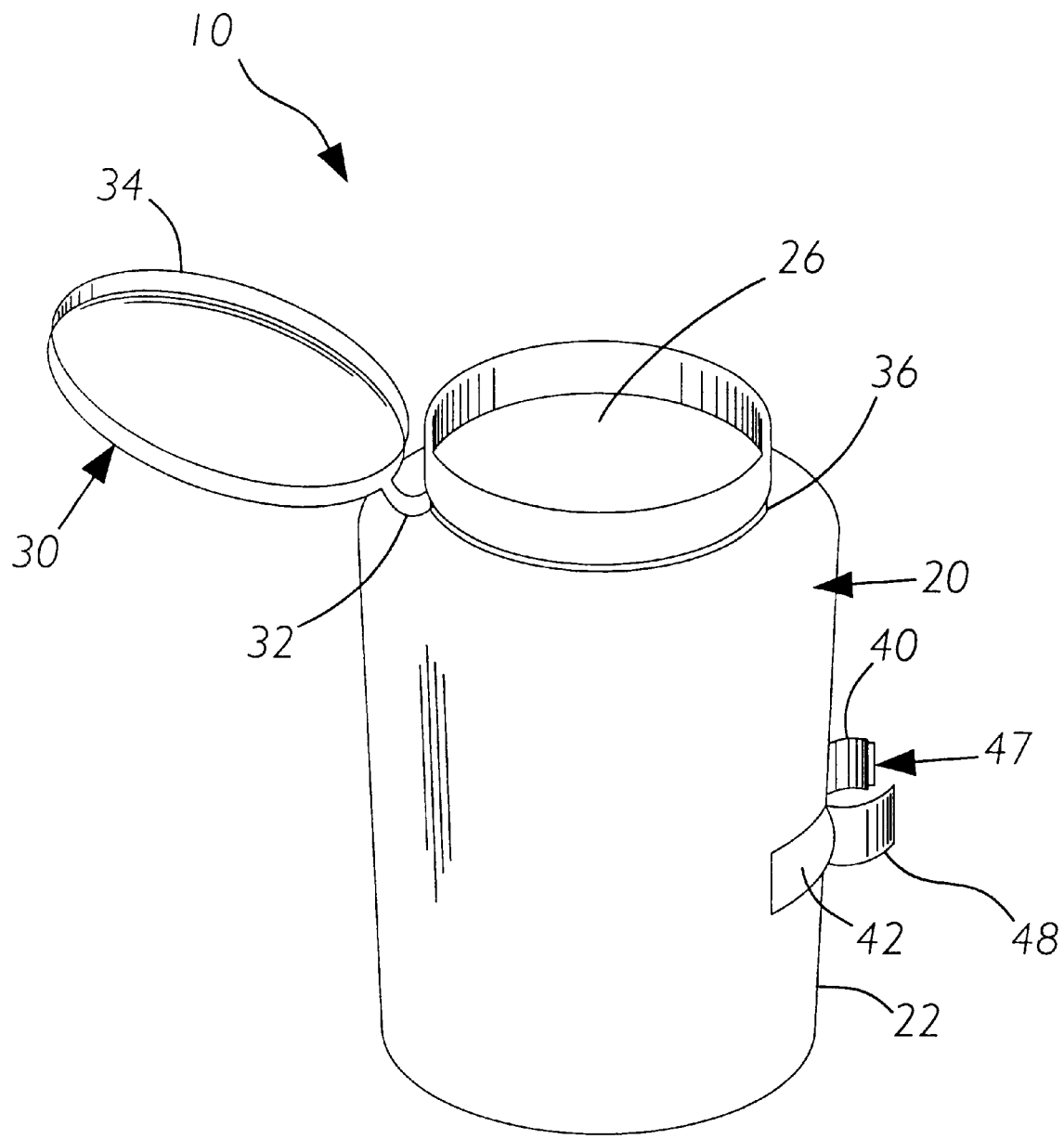
FIG. 3 is an upper perspective view of the present invention with the lid open.

As best shown in FIGS. 1 and 3, the container 20 comprises at least one side wall 22, a floor 24 enclosing one end of the side wall 22, and an opening 26 in opposition to the floor 24. As shown in FIG. 3, the side wall 22 and the floor 24 form a storage area for the conventional fishing lure 16 and the hooks 18 attached thereto. At least one partition member may be utilized within the container 20 for allowing the storage of more than one fishing lure 16. The opening 26 is large enough to easily receive the fishing lure 16.

Figure 4:
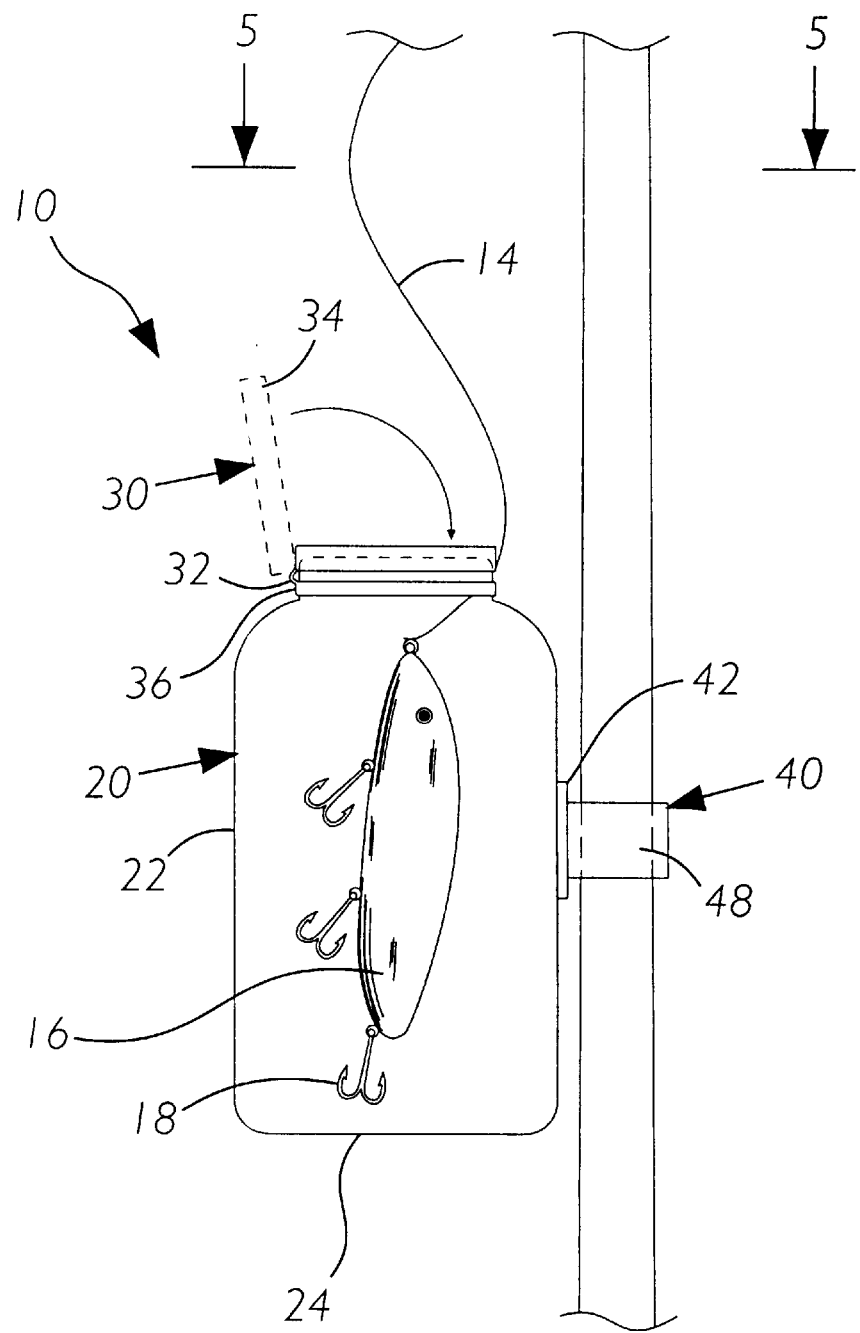
FIG. 4 is a magnified side view of the present invention with a fishing lure retained therein.

As best shown in FIGS. 1, 3 and 4 of the drawings, the lid 30 s pivotally attached to the neck of the container 20 adjacent the opening 26. A support ring 36 surrounds the neck of the container 20 as best shown in FIG. 4 of the drawings. A spring hinge 32 is attached to the support ring 36 thereby pivotally supporting the lid 30 as shown in FIGS. 3 and 4 of the drawings.

As best shown in FIG. 3 of the drawings, the lid 30 includes a lip 34 that surrounds the opening 26 of the container 20. The lip 34 is formed to loosely surround the opening 26 of the container 20 for allowing a fishing line 14 to pass through without damage. A slit or cutout into the side of the lid 30 may be utilized for allowing the fishing line 14 to pass straight through into the container 20 without engaging the lip 34.

As shown in FIGS. 1 through 5, at least one attachment bracket 40 is secured to the side wall 22. It can be appreciated that more than one attachment bracket 40 may be secured to the container 20 for providing added stability for the container 20 while attached to the shaft of the fishing rod 12.

Figure 5:
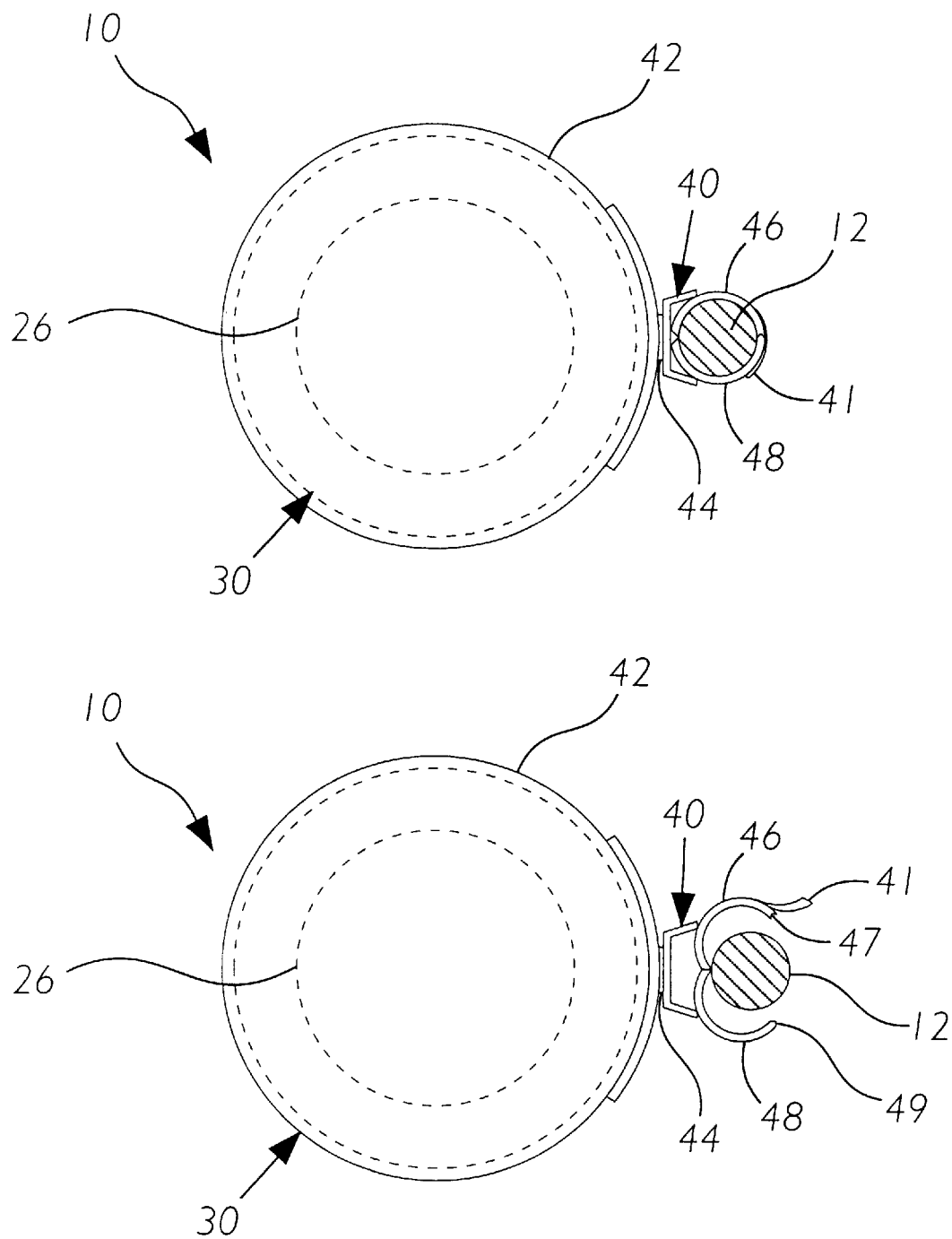
FIG. 5 is a cross sectional view taken along line 5—5 of FIG. 4 displaying the attachment bracket.

As best shown in FIG. 5 of the drawings, the attachment bracket 40 comprises a base 42, a U-member 44, a first cuff 46 and a second cuff 48. The base 42 is secured to the container 20 by a conventional attachment means such as fasteners. The base 42 is formed to the shape of the outer surface of the container 20 as show in FIG. 5 of the drawings.

The closed end of the U-member 44 is attached to the base 42 as shown in FIG. 5 of the drawings. The U-member 44 is constructed of a flexible and resilient material. The first cuff 46 and the second cuff 48 are attached to opposing distal ends of the U-member 44 as shown in FIG. 5. The cuffs 46, 48 have a C-shape that form to surround the cylindrical shape of the shaft of the fishing rod 12 as shown in FIG. 5. The inner ends of the cuffs 46, 48 are pivotally attached to one another as shown in FIG. 5.

As best shown in FIG. 5 of the drawings, the first cuff 46 includes a lock notch 47 within the distal end thereof for receiving a lock end 49 of the second cuff 48. The lock end 49 preferably has a V-shaped cross section that releasably mates with the lock notch 47 of the first cuff 46. In addition, a handle 41 is preferably attached to the first cuff 46 for allowing manual releasing of the attachment bracket 40 from the shaft of the fishing rod 12.

In use, the user simply attaches the container 20 by utilizing the attachment bracket 40 to the shaft of the fishing rod 12 as show in FIG. 5 of the drawings. The user then opens the lid 30 of the container 20 and then inserts the fishing lure 16 attached to the fishing line 14 of the fishing rod 12. The user then closes the lid 30 while the fishing lure 16 and fishing line 14 remain within the container 20. The fishing line 14 is able to pass between the lip 34 of the lid 30 and the container 20 as shown in FIG. 4 of the drawings. The user then may place tension upon the fishing line 14 to prevent entanglement. The fishing rod 12 and fishing lure 16 are now prepared to be transported without fear of entanglement or injury to an individual.

When the user desires to utilize the fishing rod 12 and fishing lure 16, the user simply opens the lid 30 and removes the fishing lure 16 from within the container 20. The user then has the option of either retaining the container 20 attached to the shaft of the fishing rod 12 or removing the container 20 by releasing the attachment bracket 40 from the shaft of the fishing rod 12 as shown in FIG. 5 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A lure transporting system, comprising:
   a container for storing a conventional fishing lure; and
   an attachment bracket secured to said container for removably securing to a shaft of a fishing rod;
   wherein said container comprises:
      at least one side wall forming an interior chamber large enough to store said conventional fishing lure; and
      an opening for receiving said fishing lure;
   a lid that is removably attachable about said opening of said container;
   wherein said lid is pivotally attached to said container by a pivot means;
   wherein said pivot means has an open position and a closed position for retaining said lid in the desired position;
   wherein said lid includes a lip for surrounding said opening;
   wherein said pivot means comprises:
      a support ring secured about said container; and
      a spring hinge attached between said support ring and said lid;
   wherein said attachment bracket comprises:
      a base attached to said container;
      a U-member secured to said base;
      a first cuff connected to a distal end of said U-member; and
      a second cuff connected to an opposing distal end of said U-member,
   wherein an inner end of said second cuff is pivotally connected to an inner end of said first cuff.

2. The lure transporting system of claim 1, wherein said first cuff includes a lock notch and said second cuff includes a lock end for engaging said lock notch when in a closed position about said shaft of said fishing rod.

3. The lure transporting system of claim 2, wherein said first cuff further includes a handle for allowing manual opening of said attachment bracket.

4. A lure transporting system, comprising:
   a container for storing a conventional fishing lure, wherein said container is transparent and tubular shaped; and
   an attachment bracket secured to said container for removably securing to a shaft of a fishing rod;
   wherein said container comprises:
      at least one side wall forming an interior chamber large enough to store said conventional fishing lure; and
      an opening for receiving said fishing lure;
   a lid that is removably attachable about said opening of said container;
   wherein said lid is pivotally attached to said container by a pivot means;
   wherein said pivot means has an open position and a closed position for retaining said lid in the desired position;
   wherein said lid includes a lip for surrounding said opening;
   wherein said pivot means comprises:
      a support ring secured about said container; and
      a spring hinge attached between said support ring and said lid;
   wherein said attachment bracket comprises:
      a base attached to said container;
      a U-member secured to said base;
      a first cuff connected to a distal end of said U-member; and
      a second cuff connected to an opposing distal end of said U-member, wherein an inner end of said second cuff is pivotally connected to an inner end of said first cuff.

5. The lure transporting system of claim 4, wherein said first cuff includes a lock notch and said second cuff includes a lock end for engaging said lock notch when in a closed position about said shaft of said fishing rod.

6. The lure transporting system of claim 5, wherein said first cuff further includes a handle for allowing manual opening of said attachment bracket.

7. A lure transporting system, comprising:
   a tubular container having an open end for receiving and storing a conventional fishing lure;
   a lid that is pivotally about said open end of said container; and
   an attachment bracket secured to said container for removably securing to a shaft of a fishing rod.

8. The lure transportation system of claim 7, wherein said lid includes a lip for surrounding said opening and preventing water from entering said container.

9. The lure transportation system of claim 7, wherein said attachment bracket comprises:
   a base attached to said container;
   a U-member secured to said base;
   a first cuff connected to a distal end of said U-member; and
   a second cuff connected to an opposing distal end of said U-member, wherein an inner end of said second cuff is pivotally connected to an inner end of said first cuff.

* * * * *